Nov. 4, 1958  R. C. IMM  2,859,344
ELECTRICAL PULSE SLICING CIRCUIT
Original Filed June 4, 1952
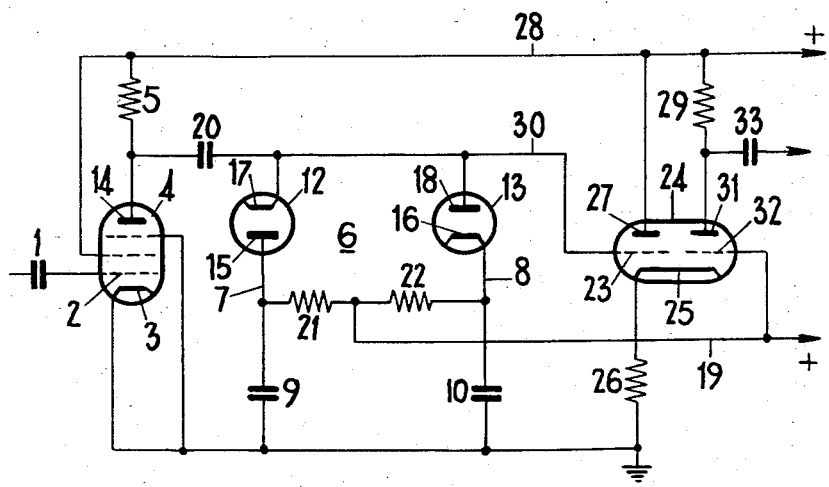
INVENTOR
RONALD CHARLES IMM
BY
Leselstein, Fischstein & Ottinger
ATTORNEYS United States Patent Office 2,859,344
Patented Nov. 4, 1958

2,859,344

ELECTRICAL PULSE SLICING CIRCUIT

Ronald Charles Imm, Ruislip Manor, England, assignor to The General Electric Company Limited, London, England Original application June 4, 1952, Serial No. 291,765, now Patent No. 2,802,102, dated August 6, 1957. Divided and this application March 20, 1957, Serial No. 647,309

5 Claims. (Cl. 250—27)

The present invention relates to electrical pulse slicing arrangements.

In signalling systems which utilise pulse code modulation, the waveform of the transmitted signal may suffer appreciable distortion during transmission, for example due to the addition of "noise." Thus in a system using binary coding in which intelligence is transmitted by a signal having either one or two levels, which may be "pulse" and "no pulse" respectively, this noise will appear as modulation on both these levels. In order to separate the required pulse signal from the noise at the receiving terminal of the system, it is known to reshape the pulse signal by effecting pulse slicing at a level between the two levels of the pulse code signal itself, this slicing level being chosen so that it is not crossed by peaks of the noise modulation on either of the levels of the pulse signal or at least so that the number of noise peaks which cross the slicing level is a minimum.

It is desirable that slicing shall be effected at substantially a predetermined level relative to both the levels of the pulse code signal but it will be appreciated that if the pulse code signal is supplied to the slicer through a valve amplifier, for example, the absolute value of these two levels may vary. The direct current component of the pulse code signal may be restored before slicing by means of a known clamping circuit but this is not entirely satisfactory since it merely ensures that the slicing level has a predetermined difference from one or other of the levels of the pulse code signal and does not take into account variations in the difference between those two levels.

It is one object of the present invention to provide a pulse slicing arrangement in which this difficulty is overcome.

According to the present invention, an electrical pulse slicing arrangement comprises a voltage slicer, an input path over which is supplied to the voltage slicer a pulse signal to be sliced, first means which is connected to the input path and which supplies a first unidirectional voltage that is a measure of the most positive level of the pulse signal, second means which is connected to the input path and which supplies a second unidirectional voltage that is a measure of the most negative level of the pulse signal, a potential dividing network connected between the first and second means so that one end of the network is maintained at the said first unidirectional voltage and the other end is maintained at the said second unidirectional voltage, said potential dividing network having a tapping point, and a connection between the voltage slicer and the said tapping point to maintain said tapping point at a voltage equal to the level at which the voltage slicer operates so that the most positive and most negative levels of the pulse signal supplied to the voltage slicer lie on opposite sides of the said slicing level.

In one arrangement, there are two parallel-connected paths each consisting of a rectifier element and a capacity connected in series, with unlike poles of the two elements connected together and one side of each of the two capacities connected together while the pulse signal to be sliced is arranged to be supplied through a further capacity one side of which is connected to the junction of the two rectifier elements. The potential dividing network is connected between the junctions of the said rectifier element and the said capacities in each of the two paths. The voltage slicer is arranged to slice the signal at the junction of the two rectifier elements while the tapping point on the potential dividing network is maintained at a predetermined voltage.

A pulse slicing arrangement in accordance with the present invention for reshaping pulse code signals will now be described by way of example with reference to the accompanying drawing which shows the circuit of the arragement. This arrangement is for reshaping a pulse code signal of the two-level binary type.

Referring to the accompanying drawing, the pulse code signal which is to be sliced is supplied through a condenser 1 between the grid 2 and the cathode 3 of a pentode thermionic valve 4 which is arranged to operate as a conventional amplifier. The signal developed across the anode load resistor 5 of this valve is supplied to a network 6 for determining the level at which slicing is to be effected. This network 6 is formed by two parallel-connected paths 7 and 8 each of which consists of a condenser 9 or 10 and a diode thermionic valve 12 or 13 connected in series. One side of each of the two condensers 9 and 10 is connected to earth while the other sides of these two condensers are connected to the anode 15 and cathode 16 respectively of the two diode valves 12 and 13, the remaining two electrodes 17 and 18 of the diode valves 12 and 13 being connected together. A condenser 20 is connected between the anode 14 of the pentode valve 4 and the junction of the electrodes 17 and 18 of the diode valves 12 and 13. Resistors 21 and 22 having the same resistance are connected in series between the junctions of the condensers 9 and 10 and the diode valves 12 and 13 in the two paths 7 and 8.

A double triode valve 24 is arranged as a voltage slicer and has a resistor 26 connected between its cathode 25 and earth. A connection 30 is provided between the junction of the electrodes 17 and 18 of the diode valves 12 and 13 and a control grid 23 of the double triode valve 24 while both the junction of the two resistors 21 and 22 and the other control grid 32 of the valve 24 are connected to a positive supply line 19. The anode 27 of the valve 24 that is associated with the grid 23 is connected directly to a positive supply line 28 so as to be maintained at approximately 250 volts above earth while a resistor 29 is connected between that supply line 28 and the other anode 31. The output from the slicer is taken from across the resistor 29 through a condenser 33.

Considering now the operation of the arrangement described above, it will be appreciated that the pulse signal to be sliced is fed through the pentode valve 4 and the condenser 20 to the control grid 23 of the valve 24 which constitutes the voltage slicer, the level at which slicing is effected being determined by the steady voltage on the control grid 32. The condenser 9 and diode valve 12 act after the manner of a peak volt meter so that there is developed across the condenser 9 a voltage equal to the most negative level of the pulse code signal supplied to the control grid 23. Similarly there is developed across the condenser 10 a voltage equal to the most positive level of the pulse signal. In other words the ends of the potentiometer formed by the resistors 21 and 22 are maintained at unidirectional voltages equal to the most positive and most negative levels of the pulse code signal supplied to the control grid 23. It follows that the most positive and most negative levels of the pulse signal supplied over the connection 30 to the voltage slicer formed by the valve 24 lie one on either side of the slicing level.

In the arrangement being described the input pulse code signal is made up of a plurality of pulse intervals which each lasts for 2.4 microseconds and in each of which there may or may not be a pulse depending upon the intelligence being transmitted. If two or more adjacent pulse intervals each contain a pulse there is thus produced, in effect, a single pulse of increased duration. In order to prevent any appreciable variation in the unidirectional voltages developed across the condensers 9 and 10 when either a plurality of adjacent pulse intervals have no pulse or alternatively, each contain a pulse, it is necessary for the combination of the condensers 9 and 10 and the resistors 21 and 22 to have a high time constant. Thus each of these condensers 9 and 10 may have a capacity of .01 microfarad and each of the resistors 21 and 22 a resistance of 100,000 ohms so that the said time constant is one millisecond, which is large compared with the duration of each individual pulse interval.

The arrangement described above for slicing a two-level signal may be extended to slicing a three-level signal. In this case it is necessary to effect slicing at two different slicing levels and for this purpose there are provided two double triode valves similar to the valve 24. Each of these double triode valves has an associated resistor connected between its cathode and earth while the two triode portions corresponding to the right hand portion of the valve 24 in the accompanying drawing have a common load resistor across which is developed the output signal. Both the voltage slicers are supplied with the same pulse signal in the manner previously described and the junction of the resistors 21 and 22 is connected to the positive supply line 19. For the purpose of controlling the slicing levels at which the two slicers operate, the appropriate control grids, corresponding to the control grid 32, of the two double triodes are connected to tapping points on the resistors 21 and 22 respectively.

This invention is a division of my application Serial No. 291,765, filed June 4, 1952, for Electrical Pulse Slicing Circuit which has issued as U. S. Patent No. 2,802,102, dated August 6, 1957, the said patent claiming a priority date of June 8, 1951, in accordance with the requirements of title 35 U. S. Code, sec. 119.

I claim:

1. An electrical pulse slicing arrangement comprising a voltage slicer, an input path over which is supplied to the voltage slicer a pulse signal to be sliced, first means which is connected to the input path and which supplies a first unidirectional voltage that is a measure of the most positive level of the pulse signal, second means which is connected to the input path and which supplies a second unidirectional voltage that is a measure of the most negative level of the pulse signal, a potential dividing network connected between the first and second means so that one end of the network is maintained at the said first unidirectional voltage and the other end is maintained at the said second unidirectional voltage, said potential dividing network having a tapping point, and a connection between the voltage slicer and the said tapping point to maintain said tapping point at a voltage equal to the level at which the voltage slicer operates so that the most positive and most negative levels of the pulse signal supplied to the voltage slicer lie on opposite sides of the said slicing level.

2. An electrical pulse slicing arrangement according to claim 1 wherein the resistances of the two parts of the potential dividing network between the tapping point and the ends of said network are equal.

3. An electrical pulse slicing arrangement according to claim 1 wherein the voltage slicer comprises a first and a second thermionic valve, each having at least a cathode and an anode and a control grid, said cathods being connected in a common supply circuit, a resistance in said common supply circuit for the cathodes, the control grid of the first valve being connected to the input path, the control grid of the second valve being physically connected to the tapping point on the potential dividing network, means maintaining the control grid of the second valve at a predetermined voltage, a resistance connected in the anode circuit of the second valve, and an output path connected between said last-named resistance and the anode of the second valve.

4. An electrical pulse slicing arrangement comprising a pair of parallel-connected paths each consisting of a rectifier element and a capacity connected in series with unlike poles of the two rectifier elements connected together and one side of each of the two capacities connected together, an input path over which a pulse signal to be sliced is supplied to the parallel-connected paths and which contains a capacity one side of which is connected to the junction of the two rectifier elements, a potential dividing network connected between the junctions of the said rectifier elements and the said capacities of each of the two paths, a voltage slicer, a connection for supplying to the voltage slicer the pulse signal developed at the junction of the two rectifier elements, means to maintain a tapping point on the said potential dividing network at a predetermined voltage, and a connection between the voltage slicer and a tapping point on the said potential dividing network over which is supplied to the voltage slicer a potential which controls the level at which it operates, this lever at which the voltage slicer operates being between the most positive and most negative levels of the pulse signal supplied thereto.

5. An electrical pulse slicing arrangement comprising a pair of parallel-connected paths each consisting of a rectifier element and a capacity connected in series with unlike poles of the two rectifier elements connected together and one side of each of the two capacities connected together, an input path over which a pulse signal to be sliced is supplied to the parallel-connected paths and which contains a capacity one side of which is connected to the junction of the two rectifier elements, a potential dividing network connected between the junctions of the said rectifier elements and the said capacities of each of the two paths, a voltage slicer to effect slicing of the signal supplied thereto at a predetermined slicing voltage, means to maintain a tapping point on the said potential dividing network at the said predetermined voltage, and a connection for supplying to the voltage slicer the pulse signal developed at the junction of the two rectifier elements.

References Cited in the file of this patent

UNITED STATES PATENTS

| 2,583,345 | Schade | Jan. 22, 1952 |
| 2,705,282 | Parode et al. | Mar. 29, 1955 |
| 2,796,461 | Nyman | June 18, 1957 |
| 2,802,102 | Imm | Aug. 6, 1957 |

FOREIGN PATENTS

| 155,696 | Australia | Mar. 15, 1954 |